Dec. 6, 1966     H. E. BEST     3,290,418
METHOD AND MOLD FOR MAKING THIN-WALLED CONTAINERS
Filed Oct. 12, 1960     2 Sheets-Sheet 1

INVENTOR.
HAROLD E. BEST
BY
ATTORNEYS

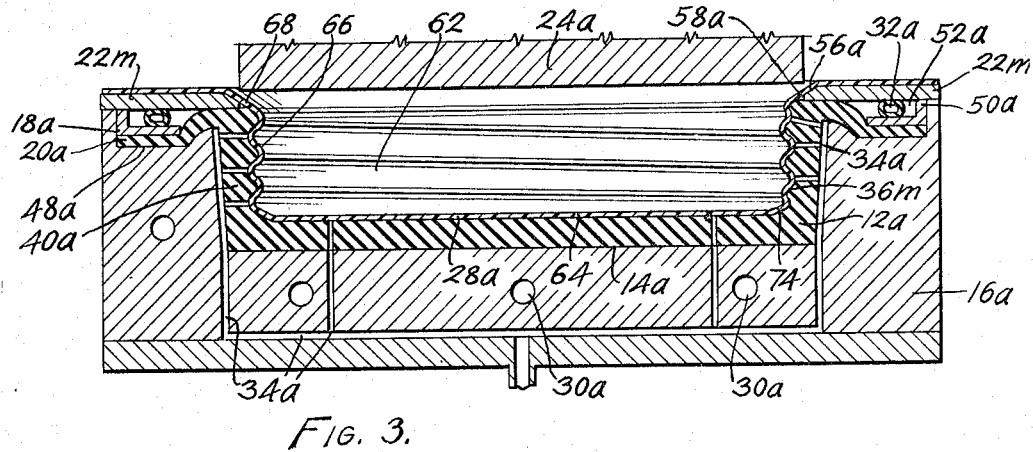
FIG. 3.
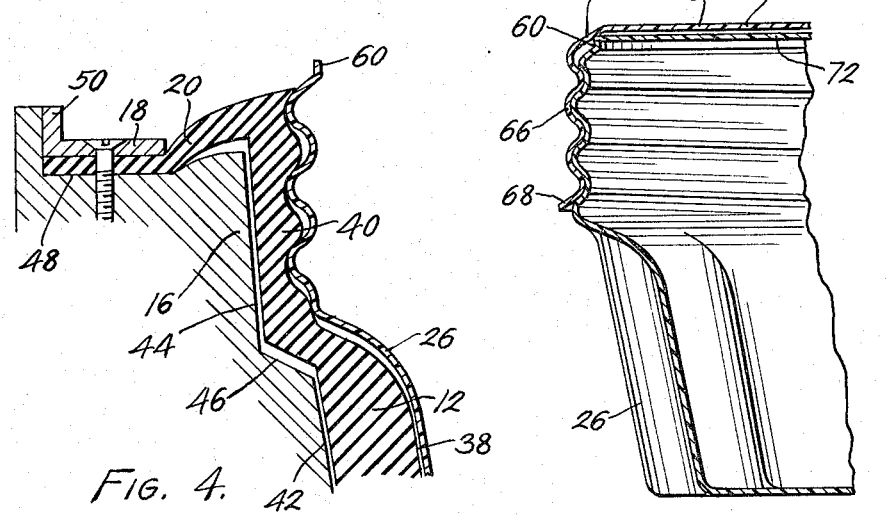
FIG. 4.
FIG. 9.
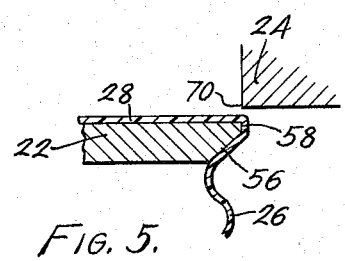
FIG. 5.
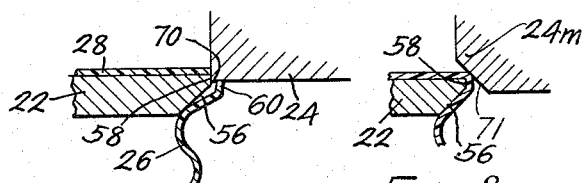
FIG. 6.
FIG. 8.
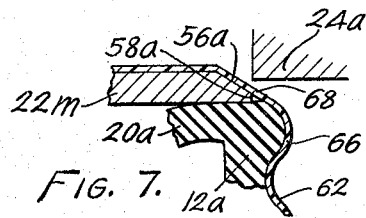
FIG. 7.
INVENTOR.
HAROLD E. BEST
BY
ATTORNEYS

United States Patent Office 3,290,418
Patented Dec. 6, 1966

3,290,418
METHOD AND MOLD FOR MAKING THIN-WALLED CONTAINERS
Harold E. Best, American National Bank Bldg., Denver, Colo.
Filed Oct. 12, 1960, Ser. No. 62,275
5 Claims. (Cl. 264—92)

This invention relates to a differential pressure molding method and female mold.

Both reuseable and throw-away types of molded plastic containers have become very popular in recent years for packaging foodstuffs, hardware items and a wide variety of other articles. For the most part, these containers are those having either hinged or friction-fit lids that are difficult, if not impossible, to effectively seal against the passage of fluids including air. Also, they are quite fragile, especially when empty, even though fabricated from relatively thick stock which increases the problems ordinarily associated with shipment, handling and storage. Perhaps the most significant factor, however, is their cost which, in many instances, exceeds that of the goods packed therein.

Plastic containers having hinged lids of one type or another are, of course, totally unsuitable for packaging liquid items and even some dry ones, especially those in powdered form. They are usually molded to provide uniform relatively thick walls which require more material and, one of the slower, more expensive molding techniques. The types of plastic suitable for use in fabricating the substantially rigid walls customarily found in hinged containers are the same as those sheet plastics that are adaptable to vacuum molding operations and the like; however, considerably less plastic is required for vacuum molding. Thus, containers that employ a hinged lid are generally restricted to use with relatively bulky dry items in which the profit margin is adequate to absorb the substantial cost of the package such as, for example, fishing lures, cosmetics, electronic parts, etc., to cite a few.

Packaging foodstuffs, on the other hand, involves quite a different problem. Here, the container must often be formed from a material that is relatively unaffected by refrigeration and obviously from one that does not contaminate the food packed therein. Ordinarily, plastic containers for this purpose are not of tthe rigid-walled type, but rather, can be deformed and crushed rather easily thus increasing the problems associated with the shipment thereof in a manner to prevent spillage due to the lids being loosened or dislodged. Effective fluid seals of the quality demanded for many foodstuffs, especially those requiring vacuum-tight or hermetic seals, are substantially impossible to achieve with a frictionally-held lid and, as a result, cans and gasketed jars are still used for packaging such products. Admittedly, plastic bottles having threaded necks adapted to receive screw tops in substantially fluid-tight sealed relation have been known for many years which would be entirely suitable for many of these items if it were not for the fact that the materials and methods known to the art as a means for fabricating them are entirely too expensive and time-consuming from the practical standpoint of the cost of the container in relation to the selling price of the packaged product.

A number of other somewhat more specialized packaging problems exist for which no reasonably-priced plastic container has yet been found to be suitable. For example, shoe polish and typewriter ribbon containers. Both of these items must be packed in substantially air-tight receptacles or else, as is the case with tyypewriter ribbons, be prepackaged or wrapped in a foil or sheet plastic wrapper of some type in the event a snap-fit metal can is used which would otherwise allow the ink to dry out. Here, as with many similar items, shelf-life becomes a significant factor as certain products may remain in the dealer's inventory for a year or more; whereas, a number of others need only be protected for a matter of a few weeks due to their rapid turnover.

Accordingly, for packaging purposes, an ideal plastic container would be one that was quite inexpensive to produce from both the standpoints of material and labor costs, and yet, would have a tight-fitting threaded cap capable of providing a substantially liquid and air-tight seal, a thin-walled body adapted to withstand considerable abuse, especially when filled with the lid in place, the ability to resist freezing temperatures without cracking or becoming otherwise damaged along with a similar resistance to heat of the magnitude likely to be encountered in sterilization, a design suitable for easily cleaning to facilitate reuse, and construction adapted to be hermetically sealed. In order to realize the above-mentioned desirable characteristics in a plastic container at a reasonable cost, a mold capable of producing them through the use of one of the faster and less expensive molding techniques such as, for example, vacuum molding, is also a necessity because the prior art methods by which bottles and the like having threaded necks are produced are prohibitive from the cost standpoint.

These prior art methods customarily involve the use of a two-part mold which must be opened to effect a release of the undercut portions of the threads following each molding operation. This, of course, is an extremely slow and costly method that is completely unsuitable for the production of inexpensive plastic containers. Also, the type and quantity of plastic required for containers formed by these methods are quite costly. At any rate, a practical mold for the production of inexpensive plastic containers and lids therefor having threaded sections or some similar type of undercut portion should, preferably, be one that would spread or otherwise yield to release the molded article without the necessity of opening the mold for this purpose. Also, as an added advantage, the mold itself should be inexpensive when compared with those metal molds found in the prior art that must be machined to extremely close tolerances.

Finally, as has already been mentioned briefly, the molding method suitable for use with the mold in the production of low-cost plastic containers must be one that is fast and susceptible of use on high-speed production lines. As such it, of course, would involve more than just the actual molding operation because the incidental operations of preparing the mold, feeding or otherwise inserting the plastic, ejecting the molded article and trimming the latter are all significant items to be considered in the overall cost.

The foregoing along with several other desirable ends have now been realized in accordance with the teaching of the instant invention. For example, it has now been found that rubber or some other such compressible plastic material can be used in the formation of a yieldable female mold insert shaped to provide various undercut portions including threads. This insert is quite inexpensive to produce originally when compared with ordinary metal molds and it has the additional advantage of being reproducible at even greater savings. The compressible nature of the insert makes it possible to accomplish minor variations in the dimension of the finished product, such as a lid fit, with the same mold by varying the differential pressure applied thereto in accordance with the teaching of the novel method soon to be described.

The complete mold comprises the aforementioned compressible insert, a rigid support therefor in the form of a solid member having a cavity therein adapted to receive the insert, means for securing a peripheral flange depending from the insert to the rigid support bordering the cavity, a removable die plate that supports the plastic laid over the insert while preventing the insert from being drawn down into the cavity, a cutting die that cooperates with the die plate to sever the molded article from the sheet of plastic while trimming the rough edges therefrom following completion of the molding operation, and appropriate vacuum and cooling conduits. The manner in which the insert is fastened to the rigid support permits the former to yield and spread out enough to release the undercut portions of the molded article once the die plate has been removed.

As for the method, it generally follows conventional vacuum molding techniques insofar as the actual molding operation is concerned except that the application of varying differential pressures across the plastic film being formed enables minor adjustments to be made in overall dimensions of the molded article with the same insert. Also, the methods followed in stripping and trimming the molded article are different and adaptable for use with the particular mold structure outlined above.

Of primary significance, however, is the fact that the molded screw-threaded plastic containers and lids formed from the mold and method to be set forth in detail herein are extremely inexpensive to produce yet offer most of the advantages of plastic, glass and metal containers costing many times their price. For example, the container and lid are both fabricated from extremely thin sheet plastic that is quite inexpensive yet, when these elements are assembled, they produce a unit which is substantially fluid-tight and capable of withstanding considerable abuse without being crushed, damaged or breaking the seal. Also, they can be heat-sealed with a thin plastic film to provide a hermetically-sealed unit resistant to refrigerating and sterilizing temperatures providing heat-resistant plastics are used. The inclusion of an upturned peripheral flange or rim on the upper margin of the threaded portion greatly facilitates the production of an effective seal either with the lid alone or the addition of a heat-sealed film while also reinforcing the body against deforming forces.

An object of the invention is the provision of a differential pressure molding method which, when used with the mold of the present invention enables variations to be made in the overall dimensions of the molded article with the same mold insert while greatly facilitating the removal and trimming operations.

Still another objective is to provide a mold characterized by a compressible elastic insert adapted to yield and release undercut portions on the article being molded while providing sufficient stiffness due to a rigid supporting structure for accurate tolerances.

An additional object is the provision of a mold of the type aforementioned which includes a die plate that functions to prevent the rim of the compressible insert from being sucked down into the cavity in the supporting structure therefor while cooperating with a cutting die to facilitate removal and trimming of the molded article.

Other objects will be in part apparent and in part pointed out specifically hereinafter in connection with the description of the drawings that follows, and in which:

FIGURE 3 is a diametrical section similar to FIGURE 2 illustrating the shape and construction of the mold used to form the screw lid rather than the body;

FIGURE 4 is a fragmentary sectional detail to an enlarged scale illustrating the manner in which the undercut portions of the molded article are released from the yieldable insert of the mold after the die plate has been removed;

FIGURE 5 is a fragmentary sectional detail to an enlarged scale showing the relative positions of the cutting die and die plate preparatory to severing the molded article from the plastic sheet from which it was formed;

FIGURE 6 is a detail similar to FIGURE 5 except that the cutting die has moved into the position it occupies following the cutting and trimming operation;

FIGURE 7 is a detail similar to FIGURE 5 showing the same operation as it is performed on the lid rather than the body;

FIGURE 8 is a view similar to FIGURE 5 showing a modified form of cutting die; and, FIGURE 9 is a fragmentary diametrical section illustrating the completed container with a heat-sealed film over the body and the lid screwed into place thereon.

Figure 1:
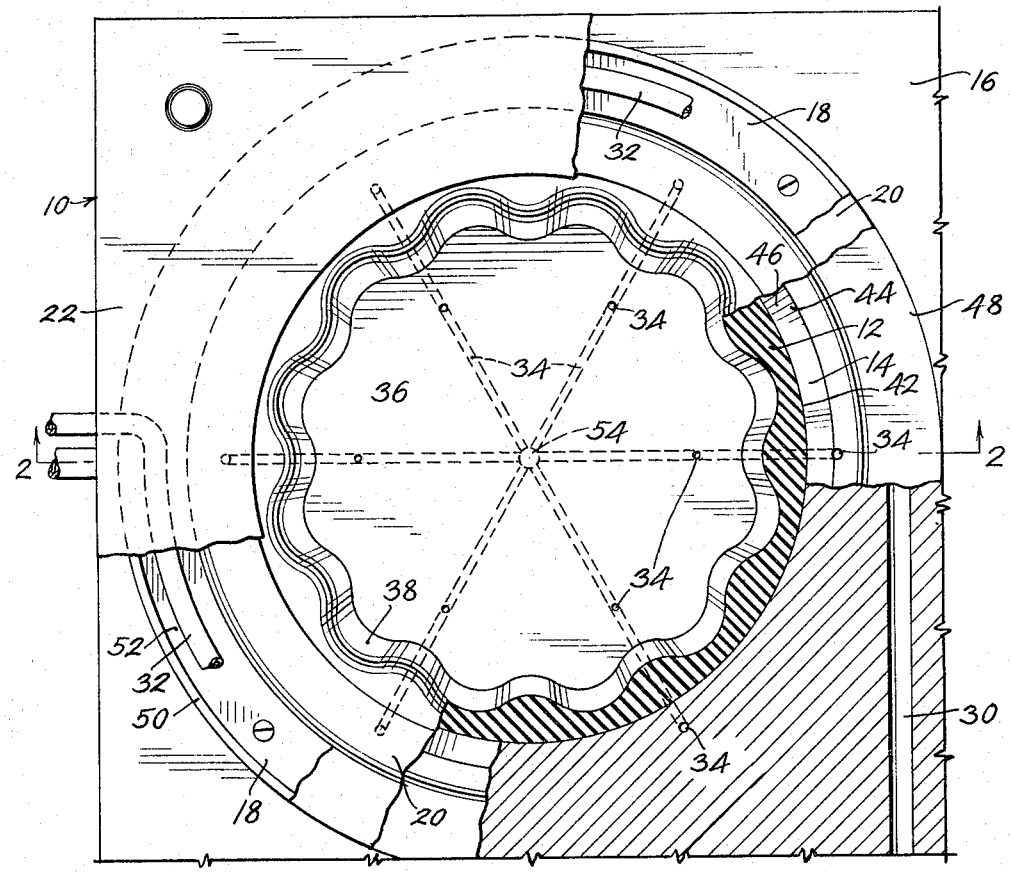
FIGURE 1 is a top plan view, portions of which have been broken away to expose the interior as shown in section, illustrating the yieldable insert female mold of the present invention.
Figure 2:
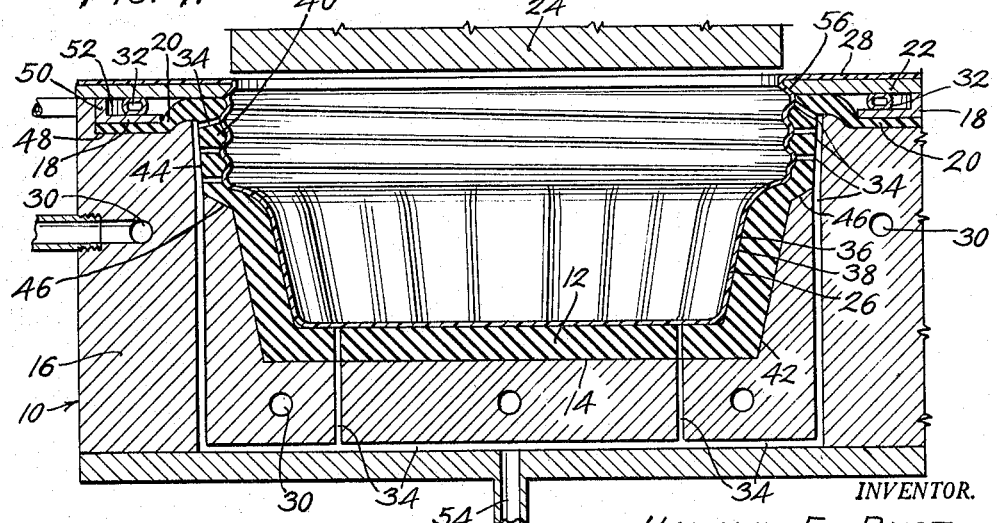
FIGURE 2 is a diametrical section taken along line 2—2 of FIGURE 1 showing, in addition, the cutting die for trimming the molded article in position over the die plate.

Referring now to the drawings for a detailed description of the present invention, and in particular to FIGURES 1 and 2 for this purpose, the mold, which has been indicated in a general way by numeral 10, will be seen to comprise a flexible and compressible insert 12 seated within a cavity 14 formed within a rigid supporting base 16, a retaining means 18 in the form of a ring positioned to overlie the flange 20 bordering the upper margin of the insert and attach same to the base, a removable die plate 22 superimposed over both the retaining ring 18 and flange 20, a cutting die 24 that cooperates with the die plate to sever the molded article 26 from the sheet 28 from which it was formed, cooling conduits 30 and 32, located to cool the body and metal parts, respectively, and vacuum passages 34 passing through the body and insert adapted to evacuate air trapped between the sheet and insert. The insert is preferably formed of heat-resistant rubber although it could easily be fabricated from some other material which is both compressible and elastic. This element includes, of course, a cavity 36 shaped in the identical configuration of the desired end product which, as indicated, includes a fluted or corrugated lower portion 38 that flares upwardly and terminates at its upper margin in a threaded section 40 having a substantially constant diameter from bottom to top. The outside surface of the insert corresponds with the shape of cavity 14 in the body 16 which, as shown, includes a generally frusto-conical lower portion 42 separated from an upper substantially frusto-conical section 44 by an annular shoulder 46. In other words, the mating surfaces of the insert and body are flared to facilitate removal of the undercut portions of the molded article from the insert in a manner which will be set forth in detail in connection with FIGURE 4 even though insert walls of varying thickness result.

While the upper section 40 inside the insert is shown shaped to provide undercuts in the form of threads, it is to be understood that it could also have other types of undercut portions such as, for example, a bayonet joint or even no undercuts at all although the latter configuration can be fabricated from the prior art non-compressible molds with no difficulty. As for the shape of the lower portion 38 of the cavity in the insert, it should be relatively shallow and generally cup-shaped without any undercuts to facilitate removal of the finished article from the mold and also insure adequate wall thickness along the sides and on the bottom where the sheet plastic is stretched the most. In other words, if the lower portions of the cavity is quite deep in relation to the diameter of the cavity of the insert, the walls of the molded article underneath the threads are likely to be stretched so thin that the container will not possess the strength required thereof. Actually, the flared and corrugated surface that has been illustrated is somewhat preferred from the standpoint that it provides a measure of additional structural strength when compared with an un-fluted frusto-conical surface. Also, the flare tends to lessen the stretch in the sheet plastic along the sides and at the corner between the walls and bottom when compared with a cylindrical shape thus resulting in walls of more uniform thickness. Note that sharp edges and corners in the insert cavity have been eliminated wherever possible.

Now a few features concerning the construction of the threaded section 40 of the insert are worthy of mention. This threaded section need not have walls of uniform thickness due to the fact that at the low differential pressures ordinarily employed, compression of the insert seems to take place only adjacent the inner surface thus eliminating any problems associated with non-uniform compression of walls which would be expected to result in variations in the diameter of the threaded neck. Also, by making the insert walls thicker near the rim, release of the undercut portions is greatly facilitated.

The peripheral flange 20 that borders the upper edge of the insert overlays the top of the mold body 16 which is provided with an annular recess 48 shaped to accommodate same. The retaining ring 18 is superimposed over the flap or flange 20 of the insert in continuous annular fluid-tight sealed relation thereto and is secured to the mold body 16 by means of suitable fasteners. Note, however, that the inner edge of the retaining ring lies in radially spaced relation to the edge of the cavity 14 in the mold body thus enabling the insert to be raised slightly therefrom in the manner indicated in FIGURE 4 which will be described in detail presently. In the particular form shown, the retaining ring 18 is provided with an upturned rim 50 along the outside edge thereof which functions as a spacer adapted to support the die plate 22 as does the flange of the insert in spaced relation above the remainder of the ring thus defining an annular passage 52 designed to receive a cooling coil 32 through which water or some other coolant circulates to prevent the adjacent element of the mold assembly from overheating. Other coolant passages 30 are provided in the mold body for purposes of circulating a coolant therethrough.

In order to form the pre-heated and softened plastic sheet into the shape of the cavity in a compressible insert, it is of course, necessary to apply a differential pressure thereto of a magnitude adapted to force the plastic tightly against the mold. This may be accomplished in one of two ways, namely, evacuate the air located between the sheet and insert so that the atmospheric pressure pushing against the sheet will accomplish the desired end or apply a positive pressure above atmospheric to the sheet while providing means for exhausting the air at atmospheric pressure on the opposite surface that would otherwise be trapped. In either event, suitable means must be provided for evacuating air from between the heat-softened sheet and the mold insert. Such means comprises a plurality of air passages 34 which are preferably connected into a common manifold 54 for purposes of vacuum molding as this manifold can then be connected directly to a single vacuum pump. For positive-pressure molding operations, on the other hand, it is only necessary to vent these air passages to the atmosphere and they need not include a common connection. The air passages pass through both the mold body and compressible insert opening into the cavity formed in the latter. In the particular form illustrated, a plurality of air passages arranged in substantially equiangularly spaced relation open through the bottom of the insert grouped around the center thereof while similar passages open onto the grooves of the threaded section. Obviously, the openings in the bottom function to draw the heat-softened plastic sheet down into the insert until it touches both the bottom and sides; whereas, the openings in the grooves insure the fact that the plastic will be drawn into the undercut portions, the lands being no problem. It should also be mentioned in this connection that the diameter of the air passages within the compressible insert is preferably substantially less than that of the registering passages within the mold body. When this is done, it is possible to apply a positive pressure to manifold 54 following formation of the molded article which, after the latter is severed from the sheet, will function to lift the insert away from the mold body thus assisting in ejection of the finished item. In other words, if the passages in the insert are too small to handle the volume of air introduced through the manifold into the mold body passages, the excess must flow into position between the body and insert lifting the latter away from the former and tending to eject the molded element at the same time.

One of the most significant and novel features of the mold assembly is the removable die plate 22 which overlies the flange of the insert contacting same to form a continuous annular seal therewith and rests on the rim 50 of the retaining ring cooperating with the latter elements to form an annular cavity 52 for the reception of cooling coil 32. The inner edge of this element includes a chamfered portion 56 on the underside thereof which cooperates with a similarly undercut portion at the top of the insert to define one of the grooves of the threaded section. This chamfered portion 56, however, does not extend to the top of the die plate to produce a feathered edge, but rather, intersects a cylindrical portion 58 adjacent the top surface as shown most clearly in FIGURES 5 and 6 which will be described presently. This die plate 22 performs several extremely important functions in the mold assembly. First of all, it provides a rigid support for the heat-softened plastic sheet that is laid over the cavity in the insert during the molding operation and, as such, prevents the top edge of the insert from being sucked down into the mold body or otherwise deformed when the differential pressure is applied thereto. Secondly, it cooperated with the cutting die 24 in severing the molded article from the sheet while providing a flat planar finished upper edge capable of forming a fluid-tight seal with the lid or a hermetic seal with a heat-sealed film. Finally, and perhaps most significant, it is responsible for the formation of a shallow upstanding cylindrical rim 60 encircling the threaded portion of the container body at the upper edge thereof which rim provides considerably additional structural rigidity to the otherwise thin-walled product while providing means ideally suited to the formation of fluid-tight seals between the body and lid.

Following completion of the actual molding operation, cooling of the molded article and severance thereof from the sheet from which it was formed, removal of the die plate from the top of the mold assembly releases the insert for movement into the position shown in FIGURE 4 so that the undercut portions of the container can be freed from the threaded section of the insert. This operation, of course, is of utmost significance to the present invention as it eliminates the need for a separable two-part mold and the additional expense entailed in forming molded articles therewith. Obviously, elimination of the die plate from the mold assembly creates many problems in connection with maintaining the desired tolerances in the molded article, formation of the cylindrical rim along the top edge thereof, severance of the finished item from the sheet from which it was formed, and removal of the completed product from the mold.

The remaining element of the mold assembly is the cutting die 24 which is designed to cooperate with the die plate to sever the molded article from the plastic sheet once it has cooled. Specific details concerning the shape of the cutting die will be deferred for the present as these details are best shown in FIGURES 5–8, inclusive, to which reference will soon be made.

Now, with reference to FIGURE 3, the mold assembly 10a has been illustrated which is used to form the lid of the container. For the most part, the same reference characters have been used that were employed in the description of FIGURES 1 and 2 to identify analogous elements except that the postscript a has been added thereto signifying such minor changes as are necessary to mold an article having a different size and shape. When, however, significant changes in an element of the lid mold assembly are present, the postscript m has been substituted for the a as, for example, when referring to the die plate.

As before, it will be noted that the lid mold assembly includes a compressible and elastic insert 12a located within a cavity 14a provided in the rigid mold body 16a. The insert is shaped in the form of a threaded lid and includes a peripheral flange 20a that rests within the annular depression 48a located on the upper surface of the mold body within which it is held by means of retaining ring 18a. A modified die plate 22m rests on the rim 50a of the ring and defines therewith the annular chamber 52a within which is located cooling coil 32a. The cutting die 24a cooperates as before with the die plate 22m to sever the molded lid from the plastic sheet used to form same. Appropriately located coolant passages 30a are found throughout the mold body as are air passages 34a which evacuate the air trapped between the plastic sheet 28a and the insert.

The lid 62 comprises a substantially planar portion 64 bordered by a threaded rim 66 which includes alternating lands and grooves formed by the threaded section 40a of the insert. The rim 66 of the lid terminates in a flared skirt 68 rather than the upstanding cylindrical section 60 at the top of the container body 26. The latter is accomplished by inverting the die plate 22m such that the chamfered portion 56a thereof is uppermost while the cylindrical section 58a is located nearest the threads. Basically, the invention of the die plate 22m for purposes of forming the skirt on the lid is the major structural change in the lid mold assembly when compared with that of the body mold assembly illustrated in FIGURES 1 and 2 except, perhaps, for the fact that the cavity 36m of the lid insert 12a is preferably slightly tapered from the open end thereof. The degree of taper is difficult to indicate in the drawings as it is preferably of the order of one-half the thickness of the plastic being used in the fabrication of the lid or less. The reason for this taper is that the wall thickness of the lid is going to be less near the base of the threaded section than at the top thereof due to the fact that the heat-softened plastic has stretched more adjacent the bottom of the mold. As a result, if no taper were employed, only those threads adjacent the skirt portion of the lid would engage the corresponding threads of the container body tightly while the remaining threads are likely to be so loose that a fluid-tight seal is difficult to achieve over the full height of the threaded section. Thus, a slight taper from the open end of the threaded section of the lid insert produces a lid having a substantially uniform inside diameter taking into account the variances therein resulting from the lands and grooves while the outer surface may include a slight taper. Note in this connection that a taper on the threaded section of the body-forming insert is unnecessary because it is immaterial that the inner surface of the threaded section of the container body may flare slightly from the open end thereof as long as the outside surface has a substantially uniform diameter as it is the latter surface to which the lid attaches.

One of the most significant features of the mold and method of using same that forms the subject matter of the present invention is the fact that minor variations in dimension can be accomplished with the same compressible inserts without modifying them in any manner. Assume, for example, that following completion of a thin-walled plastic container of the type illustrated in FIGURE 9, it was found that the lid fit a little too loosely thus raising the possibility that it would leak if filled with a liquid or finely-divided powdered material. With the mold of the present invention it becomes a simple matter to correct for this condition even in the middle of a production run as by either reducing the differential pressure on the lid molding assembly or increasing such pressure on the body mold assembly, or both, the mating elements can be made to fit together more tightly. In other words, the outside diameter of threaded neck of the container body can be increased materially by drawing a higher vacuum or applying an increased positive pressure such as to decrease the wall thickness of the compressible insert resulting in a container body having a slightly increased outside diameter. Similarly, the same end result can be accomplished by reducing the differential pressure applied to the lid mold thus accomplishing less compression of the lid insert and the attendant reduced inside diameter of the finished lid. Conversely, of course, a looser fit can be achieved by appropriate adjustments in the molding pressure. It has been found, for example, that variations of the order of 0.040 in diameter can be attained through regulation of the molding pressures. With rigid dies, on the other hand, any variance or adjustment in fit requires a time-consuming and expensive modification of the molds.

With reference now to FIGURES 5–8, inclusive, the cutting and trimming operation by which the molded articles are separated from the plastic sheet from which they were formed will be described in detail. At this stage the molded item will have cooled to the point where the plastic has set firm due to the coolant circulating through coolant conduits 30 and 32. Note also that the die plate is still in place on top of the mold assembly and the cutting die is located over the circular opening in the latter defined by cylindrical surface 58. The cutting die is, of course, supported and mounted on a suitable structure (not shown) capable of moving same downward into the opening in the die plate from the position shown in FIGURE 5 to that illustrated in FIGURE 6. The edge 70 of the cutting die cooperates with the complementary mating surface of the die plate when one passes over the other to sever the molded article from the sheet. The cutting die of FIGURES 5, 6 and 7 accomplishes the same end result irrespective of whether the die plate has the chamfered portion 56 on the top or bottom as shown specifically in FIGURES 7 and 5, respectively. Note, however, that the shearing action of the die of FIGURES 5 and 6 tends to produce a flat substantially planar upper edge on the peripheral rim 60 of the container body which is preferred for purposes of bonding a heat-sealed film thereto such as is shown in FIGURE 9.

Another style of cutting die such as that designated with reference character 24m and shown in FIGURE 8 can also be used to sever the body portion of the container from the sheet, especially for those containers which are not going to be covered with a heat-sealed film. Cutting die 24m differs from die 24 shown in the other figures of the drawing in that it is slightly larger than the diameter of the cylindrical section of the die plate and employs a chamfered or frusto-conical surface 71 that engages only the sharp edge of the die plate and pinches off the plastic rather than shearing it as was the case with the other construction. The resultant severed edge is somewhat more likely to be irregular and difficult to effectively seal with a film; hence, it is not particularly recommended for containers which are to be hermetically sealed in this manner. Also, it is considerably less effective than the shear-type cutting die for use in separating the lid from the sheet due to the fact that with the die plate inverted and the chamfered surface thereof uppermost, two nearly parallel frusto-conical surfaces are presented to one another and a clean regular cut is difficult to attain.

Ordinarily, it would not be necessary to cushion the underside of the cutting die so that it will not damage the insert as it is seldom desirable to have the die move that far into the mold cavity; however, in some instances, it may be preferable to employ a cutting die in which the cutting edge does not lie in a single plane in order to produce a scissor-like cutting action. Of necessity, such a die must move deeper into the mold cavity to complete the cut and it is, therefore, desirable to provide some type of cushion on the underside thereof adapted to engage the insert without damaging same.

FIGURE 4 illustrates the manner in which the molded article is removed from the die assembly following separation thereof from the sheet. Here the cutting die is elevated above the mold a sufficient distance to permit extraction of the molded article and the die plate has been removed. At this point the retaining ring 18 and peripheral flange 20 of the insert assume major importance as these elements cooperate with one another to widen or spread open the mouth of the insert sufficiently to free the undercut portions of the threaded section from the corresponding portions of the molded article. In other words, once the die plate has been removed, the cup-shaped portion of the rubber insert can be pushed with compressed air or otherwise raised from its seated position within the cavity in the mold body. The outer margin of the peripheral flange depending from the insert is still held down by the retaining ring, however, which causes the mouth of the insert to roll over and widen into the flared mouth of the body cavity as the insert is elevated. This, of course, increases the inside diameter of the insert measured at the lands until it becomes sufficiently larger to allow the corresponding lands on the molded article to slip past. At the same time, some compression or deformation of the lands on the threaded portion of the insert is also taking place which makes it unnecessary to spread them apart due to the cooperative action of the flange and ring to the degree necessary to completely free the container threads. This action is clearly exemplified in FIGURE 4 where it can be seen that the mouth of the insert has already spread apart to the degree required to free the top thread when it is considered that the insert is also sufficiently elastic to enable said thread to slip past. In actual use, it has been found that the insert need not deform or elevate from its seated position in the body cavity much more than that illustrated before the entire threaded section can be lifted free along with the remainder of the container.

As already mentioned, by providing the mold body with a pronounced flare at the mouth thereof surrounding the threaded section of the insert accompanied by a substantially thicker insert wall at the top of the threaded section than is found at the base, it appears, contrary to what would be expected, that the variations in wall thickness along the threaded portion of the insert have no noticeable effect on the tolerances capable of being realized in the finished article. As such, when the insert is raised in the mold body cavity, a space develops between the insert and adjacent body wall of a width sufficient to permit expansion of the threaded section of the insert to the degree necessary to free the container threads. This, of course, will work to free the undercut portions of the container, especially if the retaining ring and peripheral flange are also used. In all probability, at the nominal molding pressures normally used, only the surface of the insert is compressed thus eliminating the need for a substantially uniform insert wall thickness. Accordingly, the construction illustrated herein is much preferred. The method by which both the lid and body of the thin-walled plastic container of the present invention are formed through the use of the mold assemblies just described can best be explained by referring to all of the aforementioned figures of the drawing, namely, FIGURES 1–8, inclusive. In actual practice, the rigid mold body 16 will have multiple cavities 14, each of which contains an insert, retaining ring, die plate and related elements. At the beginning of the molding operation, all of these occupy the assembled positions of FIGURES 1–3 with the exception of the cutting die which will probably be raised higher out of the way. The thin sheet plastic to be molded will be stretched smooth and fastened securely within a clamp frame of some type. Then, the plastic sheet while still in the frame will be pre-heated to the point where it begins to sag from its own weight. This step is preferably accomplished with the plastic sheet, die plate and frame raised above the molds in close proximity to a heater, thus providing access to the molds for spray-cooling purposes or removal of finished parts. Heaters for this purpose are well known in the art and, for this reason have not been illustrated. The same is, of course, true of the clamp frames. Note in this connection that the die plate and adjacent surface areas of the mold body are being cooled continuously during the actual molding operation by the coolant passages and conduits which will prevent the plastic sheet from becoming hot enough to stick to these elements and it will sag only in the area of the cavity in the mold insert.

At this point the heat can be removed whereupon a differential pressure is immediately applied to the localized area where the plastic overlies the mold cavity and such plastic is either sucked or pushed tightly against the inside surface of the insert to form the desired impression. Here again, it should be mentioned that the dimensions of both the lid and container body can be varied within certain limits by controlling the pressures at which they are formed.

With the heat removed, the molded surface quickly sets in the pre-cooled mold to the point where it can be separated from the remnants of the plastic sheet. Therefore, the cutting die is lowered to sever the molded article from the sheet which is then removed along with the clamp frame and die plate which are no longer needed. Then, the insert is elevated within the cavity in the mold body, preferably by applying a positive pressure to the outside thereof through the air passages, causing the thread lands to expand and free the threaded portion of the container. Once both the container body and lid therefor have been molded in this fashion, they are ready for assembly and use unless a heat-sealed film is to be applied to the container body for hermetic sealing purposes after it has been filled.

Finally, with reference to FIGURE 9 of the drawings, the container produced in accordance with the method outlined above in the mold assembly already described in detail will now be set forth. The resultant lid and container body are quite delicate and very easily deformed due to their thin-walled construction when in disassembled relation; however, once they are assembled by threading the lid onto the body, they cooperate with one another to produce a unit possessing considerable structural rigidity. A number of factors are responsible for the strength exhibited by the assembled unit, some of which are rather obvious such as, for example, the cooperation between the lid and body to resist forces tending to fold the wall portions of either element inwardly. A less obvious, but extremely significant factor is the increase in structural rigidity imparted to the unit by the upstanding cylindrical rim formed along the upper edge of the container body above the threads. If this rim is eliminated, the inturned free edge of the threaded section has a tendency to fold down thus opening the threads to possible leaks, breaking the seal formed between the upper edge of the body and the adjacent planar surface of the lid, and rendering the entire unit much more susceptible to crushing loads. When such a rim is used, on the other hand, it functions to reinforce the uppermost thread on the body and engages the inside of the lid to produce a second substantially fluid-tight seal in addition to that formed by the mating threads. Also, this same rim has the effect of pushing up the planar surface of the lid stretching the latter quite tightly while, at the same time, drawing the threaded walls of the lid inwardly into fluid-tight sealed contact with the body threads. Conversely, the pressure of the lid exerted on this rim operates to spread the body threads outwardly against the lid threads. Furthermore, the uniform substantially coplanar and circular rim presents a surface considerably easier to utilize in the formation of a continuous annular fluid-tight seal with either the lid or a heat-sealed film such as that indicatetd at 72 than would be possible to achieve with the threads alone due to their pitch which results in an irregular edge of varying diameter and non-circular configuration.

For purposes of maximum effectiveness in the utilization of the upstanding rim on the body of the container, the lid should be formed to provide a chamfered or rounded edge 74 separating the threaded wall portion 66 from the planar portion 64 positioned such that it will engage the rim on the body as shown in FIGURE 9. When this is done, the rounded edge on the lid and the rim of the body cooperate with one another most fully to produce the desirable ends outlined above. The location of this rounded or chamfered edge in relation to the threaded section is such that it will engage and tighten against the body rim slightly in advance of the point at which the threads are turned up tight. In FIGURE 9 the container body has been shown provided with the heat-sealed film 72 attached to the rim of the container body. This film performs many of the functions of the lid insofar as imparting some considerable structural rigidity to the container body by preventing deformation of the walls. Also, its effect is additive when the lid is in place. Fortunately, the film does not interfere in any manner whatsoever with the above-described beneficial functions of the rim and, in fact, tends to enhance same by providing additional reinforcement for the latter. It should be mentioned, however, that when no film 72 is to be used, the height of rim 60 should preferably be extended slightly by increasing the width of the cylindrical section of the die plate by a few thousandths of an inch.

Having thus described the several useful and novel features of the mold and method used in forming same, it will be apparent that the many worthwhile objectives for which they were designed have been achieved. Although but a few of the specific embodiments of the instant invention have been illustrated and described herein, I realize that certain modifications therein may well occur to those skilled in the art within the broad teaching hereof; hence, it is my intention that the scope of protection afforded hereby shall be limited only insofar as said limitations are expressly set forth in the appended claims.

What is claimed is:

1. A mold for use with a differential pressure molding method to form relatively thin-walled substantially-rigid plastic items from plastic sheet stock which comprises, a rigid body having a tapered shallow cavity therein, a generally cup-shaped compressible elastic insert seated within the cavity in the body, said insert having a peripheral flange bordering the upper edge thereof and overlying the top of the body, and said insert including a centrally-located cavity shaped to form a molded article, fixed retaining means overlying the flange and fastening the latter to the body along its free edge, a rigid die plate removably supported on the retaining means with said plastic sheet stock being adapted to overlie said die plate, said die plate having a central opening therein the edge of which overlies the upper margin of the inert cavity forming a continuation thereof, and conduit-forming means opening onto the interior of the insert cavity through both the body and said insert for the purpose of evacuating air therefrom.

2. The mold as set forth in claim 1 in which a cutting die is mounted for movement into the central opening in the die plate, said cutting die being shaped to cooperate with the edge of the die plate bordering the opening therein to separate a molded article located within the insert cavity from the sheet of plastic from which it was formed.

3. The method of forming thin-walled plastic containers of the type which include undercut portions adjacent their mouth in a mold having a rigid body with a cup-shaped cavity therein, a compressible insert seated within the body cavity and containing a centrally-located cavity shaped in the form of the article to be molded together with a flange along its upper edge bordering the latter cavity, means for fastening the flange to the body, a removable rigid die plate overlying the flange containing a central opening registering with the cavity in the insert in a manner to form a continuation thereof, and conduit-forming means opening onto the insert cavity adapted to evacuate air trapped therein underneath the plastic sheet being formed, which comprises the steps of pre-heating a sheet of plastic to a temperature where it begins to sag, laying the pre-heated sheet over the central opening in the die plate in substantially air-tight sealed contact therewith, evacuating the air from within the insert cavity in a manner such that the differential pressure applied to the heat-softened sheet will force the latter into intimate contact with the shaped surface of the insert defining the cavity therein, cooling the shaped sheet until it sets, separating the shaped portion of the plastic from the remainder of the sheet, and ejecting the molded article from the cavity in the insert by removing the die plate, applying air pressure to expand the elastic insert and to lift the same from the body cavity until the fastened flange thereof expands the mouth of the insert to the extent required for release of the undercut portions of the said shaped seat.

4. A mold for use with a differential pressure molding operation to form relatively thin-walled plastic items, which comprises, a rigid body having a cavity therein, a cup-shaped elastic rubber-like insert within the cavity in the body with the insert including a shaped molding cavity, a rigid die plate removably mounted upon the body over the entrance of the cavity and having an opening therein, the edge of which overies the upper margin of the molding cavity to form the mouth thereof and conduit forming means opening into the interior of the molding cavity and extending through the wall of the insert for the purpose of evacuating air therefrom.

5. In the mold defined in claim 4, said body cavity walls being flared outwardly towards the mouth of the cavity and said insert being loosely affixed to the body to permit partial removal therefrom and expansion thereof when so partially removed whereby to facilitate removal of an item formed in the insert molding cavity from the insert cavity.

References Cited by the Examiner
UNITED STATES PATENTS

| | | | |
|---|---|---|---|
| 2,152,738 | 4/1939 | Jeffery. | |
| 2,190,807 | 2/1940 | Steinberger | 18—56 |
| 2,233,174 | 2/1941 | McDonald | 18—19 |
| 2,255,116 | 9/1941 | Helmstaedter | 18—19 |
| 2,282,423 | 5/1942 | Kopitke | 18—19 |
| 2,298,223 | 10/1942 | Miller. | |
| 2,611,170 | 9/1952 | Theis. | |
| 2,714,226 | 8/1955 | Axelrad. | |
| 2,876,926 | 3/1959 | Gronemeyer | 220—39 |
| 2,887,244 | 5/1959 | Betner | 220—39 |
| 2,891,280 | 6/1959 | Politis | 18—19 |
| 2,953,814 | 9/1960 | Mumford | 18—19 |
| 2,985,914 | 5/1961 | Miller | 18—19 |
| 2,990,581 | 7/1961 | Rowe | 264—92 X |

ROBERT F. WHITE, *Primary Examiner.*

EARL J. DRUMMOND, MICHAEL V. BRINDISI, ALEXANDER H. BRODMERKEL, *Examiners.*

T. E. CONDON, M. R. DOWLING, *Assistant Examiners.*